United States Patent

Uryu et al.

[11] Patent Number: 5,558,578
[45] Date of Patent: Sep. 24, 1996

[54] DRIVING FORCE TRANSMITTING DEVICE

[75] Inventors: Naoyuki Uryu, Anjo; Hiroshi Watanabe, Chita-gun; Hiroyuki Kato, Okazaki, all of Japan

[73] Assignee: Aisin Seiki Kabushiki Kaisha, Aichi-pref, Japan

[21] Appl. No.: 246,663

[22] Filed: May 20, 1994

[30] Foreign Application Priority Data

May 20, 1993 [JP] Japan ................. 5-118337

[51] Int. Cl.[6] ................................. F16C 1/06
[52] U.S. Cl. .................. 464/52; 74/502.5; 464/173; 464/183
[58] Field of Search ...................... 464/183, 173, 464/180, 52, 57; 74/502.5, 500.5; 248/429, 419

[56] References Cited

U.S. PATENT DOCUMENTS

| | | | |
|---|---|---|---|
| 2,821,092 | 1/1958 | Cordora et al. | 464/173 X |
| 2,890,576 | 6/1959 | Bentley | 464/183 X |
| 3,546,961 | 12/1970 | Marton | 74/502.5 |
| 4,052,911 | 10/1977 | Feldstein | 74/502.5 |
| 4,393,728 | 7/1983 | Larson et al. | 74/502.5 |
| 4,424,045 | 1/1984 | Kulischenko et al. | 464/52 |
| 4,915,340 | 4/1990 | Nawa et al. | |
| 5,161,427 | 11/1992 | Fukuda et al. | 464/173 X |

FOREIGN PATENT DOCUMENTS

| | | | |
|---|---|---|---|
| 64-17845 | 1/1989 | Japan . | |
| 40-1202533 | 8/1989 | Japan | 74/502.5 |

Primary Examiner—Daniel P. Stodola
Assistant Examiner—Eileen A. Dunn
Attorney, Agent, or Firm—Fisher & Associates

[57] ABSTRACT

A driving force transmitting device for transmitting driving force from a driving member to a driven member incorporates a wired cable operatively connected with each of the driving member and the driven member, wherein the wired cable rotated by the driving member drives the driven member, an outer tube through which the wired cable is fitted, and supporting tubes fitted in the outer tube and in frictional engagement with the wired cable. The supporting tubes support the wired cable when the wired cable is rotated. An inner tube receives the wired cable therein with a clearance defined between the inner tube and the wired cable. The inner tube is positioned within the outer tube and between the supporting tubes.

7 Claims, 3 Drawing Sheets

5,558,578

DRIVING FORCE TRANSMITTING DEVICE

BACKGROUND OF THE INVENTION

This invention relates to a driving force transmitting device, and in particular to a device in which a driving force is expected to be transmitted from a drive member to a driven member through a wire cable.

In a conventional driving force transmitting device, such as that disclosed, for example, in Japanese Utility Model Laid-open Print No. 64(1989)-17845 which corresponds to the U.S. Pat. No. 4,915,340, a wired cable is connected at its opposite ends to a driving member and a driven member, respectively. The wired cable is set to be protected by an outer tube in such a manner that the wired cable passes the outer tube. In the conventional device, a clearance is defined between the wired cable and the outer cable in order to establish smooth rotation of the wired cable. However, such a structure inevitably results in the binding of the wired cable. Thus, collision noise is generated whenever the wired cable is brought into engagement with the outer tube. In the conventional device, in order to reduce the collision noise, an inner tube is secured in the outer tube so as to be opposed to the wired cable.

However, in the conventional device, the clearance per se remains and therefore the wired cable can vibrate resulting in the degradation of the driving force transmission efficiency.

SUMMARY OF THE INVENTION

It is an object of the invention to provide an improved driving force transmitting device which obviates the above conventional drawbacks.

It is another object of the invention to provide an improved driving force transmitting device that eliminates vibration in a wired cable.

In order to attain the foregoing objects, a driving force transmitting device includes a driving member, a driven member, a wired cable interposed between the driving member and the driven member, an outer tube through which the wired cable is passed, and a supporting device provided in the outer tube for preventing the binding of the wired cable.

BRIEF DESCRIPTION OF THE DRAWINGS

The above and other objects, features and advantages of the present invention will be more apparent and more readily appreciated from the following detailed description of preferred exemplary embodiments of the present invention, taken in connection with the accompanying drawings, in which.

DESCRIPTION OF THE PREFERRED EMBODIMENTS

Figure 1:
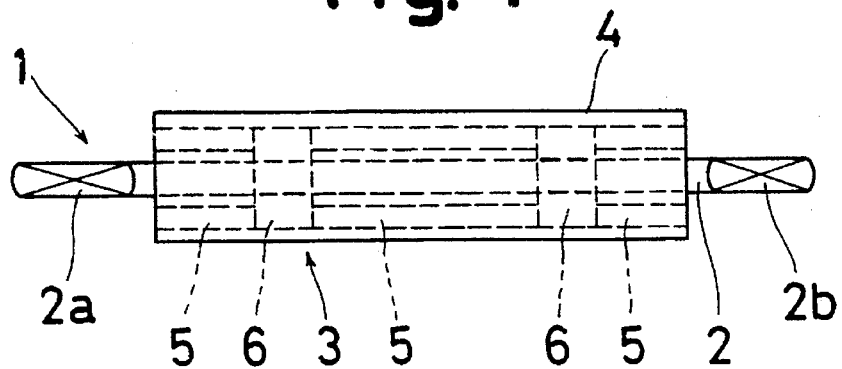
FIG. 1 is a plain view of a driving force transmitting device according to the present invention.
Figure 2:
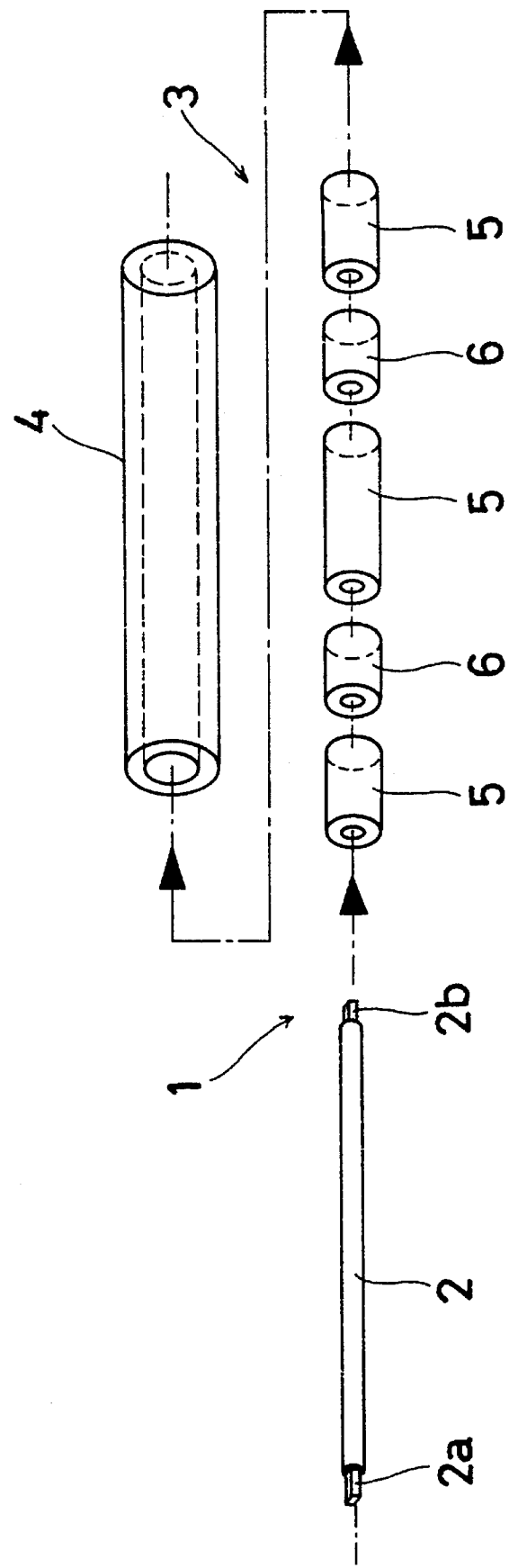
FIG. 2 is an exploded perspective view of the device illustrated in FIG. 1.

Referring first to FIGS. 1 and 2, there is illustrated a driving force transmitting device 1 which includes a wired cable 2 and a covering member 3.

A wired cable 2 is formed in such a manner that a plurality of wires are twisted after being bundled, and each of end portions 2a and 2b of the wired cable 2 is formed into a rectangular shape in cross-section.

The cover member 3 which is expected to cover or hold the wired cable 2 includes an outer tube 4, three spaced cylindrical inner tubes 5 and two cylindrical structure supporting tubes 6 each of which is disposed between two adjacent inner tubes 5. As a raw material for the outer tube 4, a relatively hard resin such as a nylon is used. As a raw material for the inner tube 5, a relatively soft resin such as a vinyl chloride is used.

Figure 3:
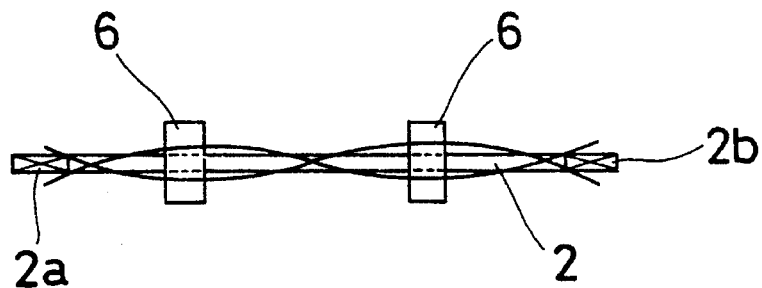
FIG. 3 is a view showing how each supporting tube is arranged relative to a wired cable.

The inner tube 5 is expected to be snugly fitted in the outer tube 4 and is provided with a clearance for enabling a smooth rotation of the wired cable 2. As a raw material for the supporting tube 6, a material which is excellent in both rotational friction duality and elasticity such as a compressed felt material is used. Each of the supporting tubes 6 is snugly fitted in the outer tube 4, in alignment with the two adjacent inner tubes 5 and in friction engagement with the wired cable 2. As seen from FIG. 3, one of the supporting tubes 6 (the other of the supporting tubes 6) is set to be positioned so as to correspond to the vicinity at which the amplitude of vibration of the wired cable 2 is the largest when the wired cable 2 is rotated. It is to be noted that in FIG. 3 the depiction of the wired cable 2 in vibration is to illustrate the position at which the amplitude of vibration of the wired cable 2 is the largest and to which each the supporting tubes 6 corresponds. Thus, it should not be understood that FIG. 3 shows the actual behavior of the wired cable 2.

The driving force transmitting device 1 which is constructed as mentioned above is used as an important functional element of a seat apparatus 10 as will be detailed hereinbelow.

Figure 4:
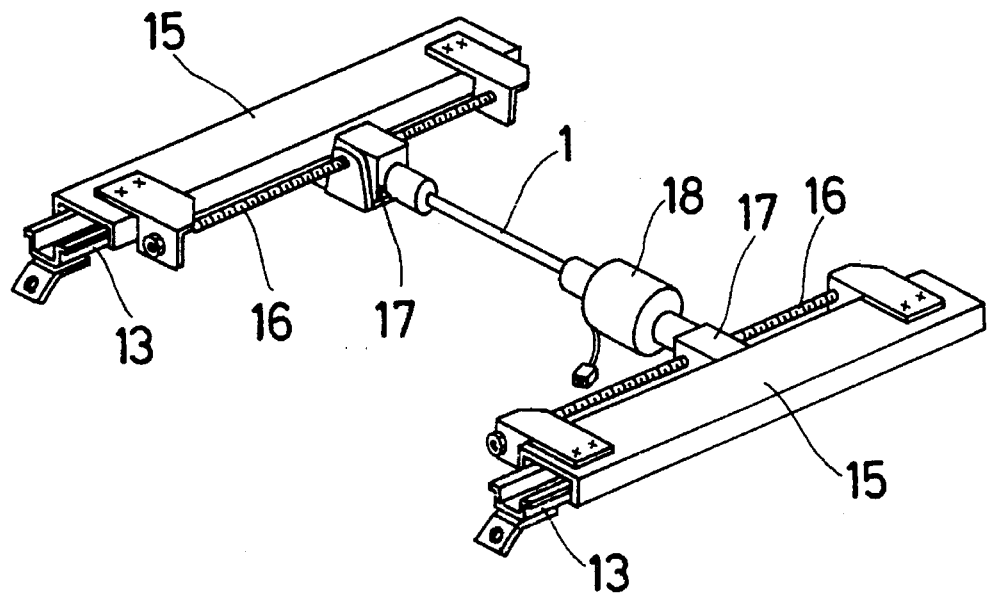
FIG. 4 is a perspective view of a principal portion of a seat apparatus in which a driving force transmitting device according to the present invention is employed.
Figure 5:
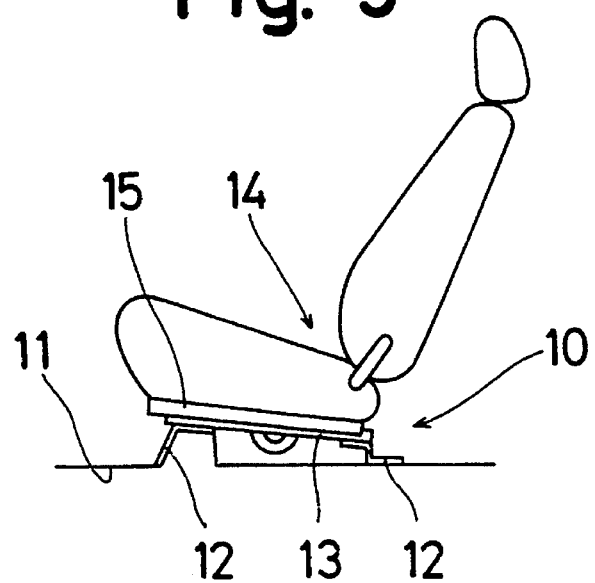
FIG. 5 is a side view of the seat apparatus illustrated in FIG. 4 according to the present invention.
Figure 6:
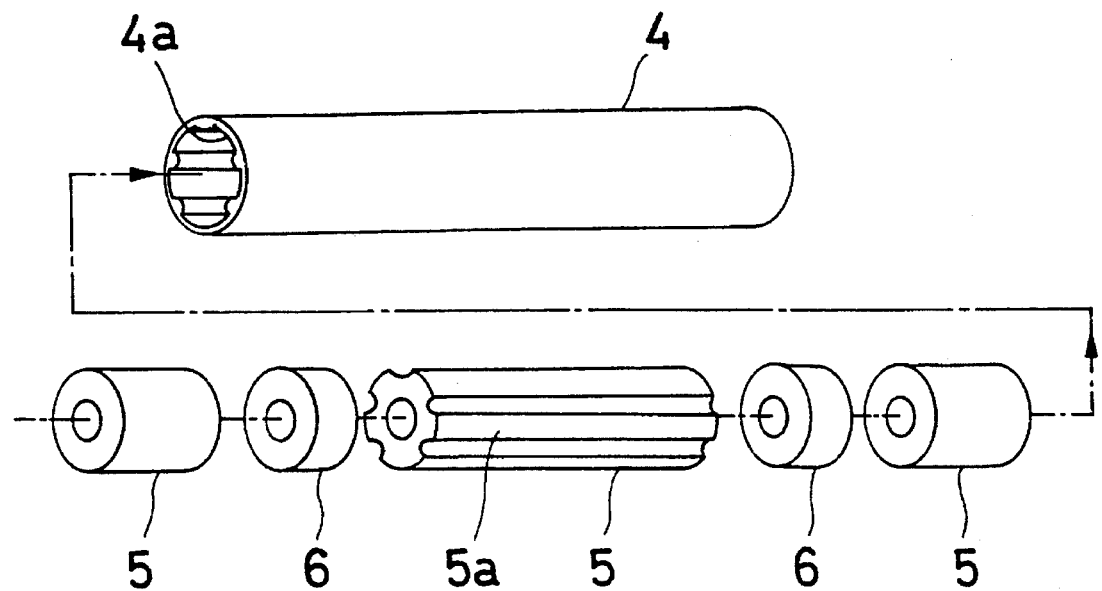
FIG. 6 is an alternative to the arrangement depicted in FIG. 2.

As can be seen from FIGS. 4 and 5, the seat apparatus 10 includes a pair of spaced lower rails 13 each of which is secured via a bracket 12 to a vehicle body floor 11, a pair of upper rails 15 mounted slidably on the pair of lower rails 13, respectively, a seat 14 mounted on the upper rails 15, a screw shaft 16 secured to and arranged in parallel with the upper rail 15, a driven member or speed reducer 17 secured to the lower rail such that an output member (not shown) is screwed with the screw shaft 16, and a driving member or motor 18 connected to each of the speed reducers 17 via the driving force transmitting device 1. The end portions 2a and 2b are connected to an input member (not shown) of the speed reducer 17 and an output member (not shown) of the motor 18, respectively.

The seat apparatus 10 assembled as mentioned above will operate as follows.

When the motor 18 is turned on, the wired cable 2 is rotated which results in an operation of the speed reducers 17. Thus, a driving force from the motor 18 is transmitted to each of the screw shafts 16, and each upper rail 15 is brought into movement relative to the corresponding lower rail 13 secured to the floor 11, with the result that the position of the seat apparatus 10 relative to the floor 11 in the lengthwise direction thereof can be adjusted. While the wired cable 2 is being rotated, the rigidity of the outer tube 4 prevents the binding of the wired cable 2, and the supporting tubes 6 which support the wired cable 2 directly prevent the vibration of the wired cable 2. Thus, smooth transmission of the driving force from the motor 18 to each speed reducer 17 can be attained.

In addition, each inner tube 5 prevents the wired cable 2 from being engaged with the outer tube 4, with the result that no collision noise can be generated.

For enabling easy assembly of the device 1, the mid-positioned inner tube 5 can be fitted loosely in the outer tube 4. In this situation, the outer surface of the mid-positioned inner tube 5 (the inner surface of the outer tube 4) is provided with a plurality of radially spaced projections 5a (a plurality of radially spaced recesses 4a) which extend in the axial direction. Such a structure under which the projections 5a are in engagement with the respective recesses 4a is directed to preventing the relative movement between the mid-positioned inner tube 5 and the outer tube 4. In brief, the mid-positioned inner tube 5 is in a spline engagement with the outer tube 4. The outermost inner tubes 5 should be snugly fitted in the outer tube 4. Such a snug fitting serves to prevent the extraction of the mid-positioned inner tube 5 from the outer tube 4.

Obviously, numerous modifications and variations of the present invention are possible in light of the above teachings. It is therefore to be understood that within the scope of the appended claims, the invention may be practiced in forms other than as specifically described herein.

What is claimed is:

1. A driving force transmitting device for transmitting driving force from a driving member to a driven member, comprising:

a wired cable operatively connected with each of the driving member and the driven member, wherein the wired cable rotated by the driving member drives the driven member;

an outer tube through which the wired cable is fitted; and supporting tubes fitted in the outer tube and in frictional engagement with the wired Cable, wherein the supporting tubes support the wired cable when the wired cable is rotated.

2. A driving force transmitting device in accordance with claim 1, wherein each of the supporting tubes is positioned at a portion of the wired cable around which the amplitude of vibration of the wired cable is greatest.

3. A driving force transmitting device in accordance with claim 1, wherein a raw material for each of the supporting tubes is a relatively soft resin having characteristics of rotational friction duality and elasticity.

4. A driving force transmitting device in accordance with claim 3, wherein the relatively soft resin is a compressed felt material.

5. A driving force transmitting device in accordance with claim 4, wherein the inner tube is snugly fitted in the outer tube.

6. A driving force transmitting device in accordance with claim 5, wherein the inner tube is in a spline connection with the outer tube.

7. A driving force transmitting device in accordance with claim 1, further comprising:

an inner tube for receiving the wired cable therein with a clearance defined between the inner tube and the wired cable, wherein the inner tube is positioned within the outer tube and between the supporting tubes.

* * * * *